(12) United States Patent
Fujioka et al.

(10) Patent No.: US 10,844,843 B2
(45) Date of Patent: Nov. 24, 2020

(54) WIND TURBINE BLADE AND WIND TURBINE POWER GENERATING APPARATUS, AND METHOD OF PRODUCING OR RETROFITTING WIND TURBINE BLADE

(71) Applicant: MHI Vestas Offshore Wind A/S, Aarhus N (DK)

(72) Inventors: Hideyasu Fujioka, Aarhus N (DK); Kenji Sato, Aarhus N (DK)

(73) Assignee: MHI VESTAS OFFSHORE WIND A/S, Aarhus N (DK)

( * ) Notice: Subject to any disclaimer, the term of this patent is extended or adjusted under 35 U.S.C. 154(b) by 562 days.

(21) Appl. No.: 15/167,947

(22) Filed: May 27, 2016

(65) Prior Publication Data
US 2016/0348643 A1 Dec. 1, 2016

(30) Foreign Application Priority Data

May 28, 2015 (JP) ................................ 2015-108635

(51) Int. Cl.
| | |
|---|---|
| *F03D 80/30* | (2016.01) |
| *F03D 1/06* | (2006.01) |
| *F03D 80/50* | (2016.01) |
| *F03D 9/25* | (2016.01) |

(52) U.S. Cl.
CPC ........... *F03D 80/30* (2016.05); *F03D 1/0675* (2013.01); *F03D 9/25* (2016.05); *F03D 80/50* (2016.05); *F05B 2230/80* (2013.01); *F05B 2260/95* (2013.01); *F05B 2280/10* (2013.01); *F05B 2280/5001* (2013.01); *Y02E 10/721* (2013.01); *Y02P 70/523* (2015.11)

(58) Field of Classification Search
CPC ....... F03D 1/0675; F03D 80/30; B64D 11/20; B64D 11/205; B64D 45/02; F05B 2260/95
See application file for complete search history.

(56) References Cited

U.S. PATENT DOCUMENTS

| | | | |
|---|---|---|---|
| 5,908,522 A * | 6/1999 | Lofstrom | .............. B64C 11/205 |
| | | | 156/94 |
| 8,517,681 B2 | 8/2013 | Naka et al. | |
| 8,734,110 B2 | 5/2014 | Kuroiwa et al. | |

(Continued)

FOREIGN PATENT DOCUMENTS

| | | |
|---|---|---|
| CN | 101240772 A | 8/2008 |
| CN | 201606117 U | 10/2010 |

(Continued)

OTHER PUBLICATIONS

Office Action in KR Application No. 10-2016-0060095, dated Oct. 24, 2016.

(Continued)

*Primary Examiner* — Moshe Wilensky
*Assistant Examiner* — Christopher R Legendre
(74) *Attorney, Agent, or Firm* — Kanesaka Berner and Partners LLP

(57) ABSTRACT

A wind turbine blade includes: a blade body extending from a blade root along a blade longitudinal direction toward a blade tip; and a metal strip provided to cover at least a leading edge at the blade tip side of the blade body so as to suppress erosion at the leading edge of the blade body.

3 Claims, 7 Drawing Sheets

(56) References Cited

U.S. PATENT DOCUMENTS

| | | | | |
|---|---|---|---|---|
| 8,770,942 | B2* | 7/2014 | Saitou | F03D 1/0675 |
| | | | | 416/224 |
| 8,858,184 | B2* | 10/2014 | Nissen | B64C 11/205 |
| | | | | 416/241 B |
| 8,961,142 | B2* | 2/2015 | Wansink | B29D 99/0025 |
| | | | | 416/224 |
| 9,410,533 | B2* | 8/2016 | Loewe | B29C 70/443 |
| 2007/0036659 | A1 | 2/2007 | Hibbard | |
| 2008/0193292 | A1 | 8/2008 | Stam et al. | |
| 2011/0142678 | A1 | 6/2011 | Santiago et al. | |
| 2013/0045105 | A1 | 2/2013 | Driver et al. | |
| 2013/0101426 | A1 | 4/2013 | Saitou et al. | |
| 2013/0149153 | A1 | 6/2013 | Fujioka et al. | |
| 2013/0294923 | A1 | 11/2013 | Takeuchi et al. | |
| 2014/0186188 | A1 | 7/2014 | Takeuchi | |
| 2016/0215757 | A1* | 7/2016 | Behmer | B29C 70/086 |
| 2016/0348643 | A1* | 12/2016 | Fujioka | F03D 1/0675 |

FOREIGN PATENT DOCUMENTS

| | | | |
|---|---|---|---|
| CN | 102472254 A | 5/2012 | |
| CN | 102536630 A | 7/2012 | |
| CN | 102918262 A | 2/2013 | |
| CN | 202811193 U | 3/2013 | |
| CN | 103016279 A | 4/2013 | |
| CN | 103329379 A | 9/2013 | |
| DE | 102005051537 A1 * | 5/2007 | F03D 80/30 |
| DE | 102011113482 A1 | 3/2013 | |
| EP | 1011182 A1 | 6/2000 | |
| EP | 2157316 A2 | 2/2010 | |
| EP | 2559891 A2 | 2/2013 | |
| EP | 2623773 A2 | 8/2013 | |
| EP | 2674613 A2 | 12/2013 | |
| EP | 2770197 A2 | 8/2014 | |
| JP | 2006-521485 A | 9/2006 | |
| JP | WO 2013084370 A1 * | 6/2013 | H02G 13/00 |
| JP | 2013-155723 A | 8/2013 | |
| JP | 2013-181437 A | 9/2013 | |
| WO | 2010/117262 A1 | 10/2010 | |
| WO | 2010/119298 A1 | 10/2010 | |
| WO | 2012/102294 A1 | 8/2012 | |
| WO | 2013/084634 A1 | 6/2013 | |
| WO | 2013/129046 A1 | 9/2013 | |
| WO | 2014/102957 A1 | 7/2014 | |
| WO | 2015/015202 A1 | 2/2015 | |
| WO | WO-2015055213 A1 * | 4/2015 | |

OTHER PUBLICATIONS

Office Action in KR Application No. 10-2016-0060095, dated Apr. 27, 2017.

Office Action in JP Application No. 2015-108635, dated Feb. 23, 2018. 8pp.

Office Action in EP Application No. 16170757.5, dated Nov. 20, 2017. 5pp.

Extended European Search Report in EP Application No. 16170757.5 dated Oct. 20, 2016.

Office Action in CN Application No. 201610366013.X, dated May 23, 2018, 26pp.

Office Action for Chinese Application No. 201610366013.X dated Feb. 2, 2019; 26pp.

Office Action for Chinese Application No. 201610366013.X dated Aug. 22, 2019; 21pp.

* cited by examiner

BLADE LONGITUDINAL DIRECTION

BLADE LONGITUDINAL DIRECTION

WIND TURBINE BLADE AND WIND TURBINE POWER GENERATING APPARATUS, AND METHOD OF PRODUCING OR RETROFITTING WIND TURBINE BLADE

RELATED APPLICATIONS

The present application is based on, and claims priority from, Japanese Application Number 2015-108635, filed May 28, 2015, the disclosure of which is hereby incorporated by reference herein in their entirety.

TECHNICAL FIELD

The present disclosure relates to a wind turbine blade and a wind turbine power generating apparatus, and a method of producing or retrofitting the wind turbine blade.

BACKGROUND ART

In recent years, in the context of preservation of the global environment, wind turbine power generating apparatuses utilizing wind power have become widely used. In general, a wind turbine power generating apparatus converts kinetic energy of wind into rotational energy of a wind turbine blade (more specifically, of an entire rotor including a wind turbine blade), and further converts this rotational energy into electric power with a generator.

In such a wind turbine power generating apparatus, rain drops or dust may hit a wind turbine blade to bring about erosion. If damage to a wind turbine blade due to erosion becomes obvious, smoothness of a blade surface reduces and thus an undesirable phenomenon such as a noise increase may occur.

Thus, various approaches are proposed and practically used to reduce incidence of erosion.

For instance, Patent Document 1 discloses a configuration of a wind turbine blade whose surface is covered by a protection coating to protect the wind turbine blade from damage due to collision with foreign substances such as rain drops and ice particles.

Further, Patent Document 2 discloses a configuration of a wind turbine blade with a protection layer made of an elastic material or the like disposed on a leading edge to protect the wind turbine blade from erosion.

Still further, Patent Documents 3 and 4 disclose configurations of a wind turbine blade with a protection tape and a protection sheet, respectively, applied to a leading edge.

CITATION LIST

Patent Literature

Patent Document 1: EP2674613A
Patent Document 2: EP2559891A
Patent Document 3: WO2013/129046A
Patent Document 4: WO2012/102294A

SUMMARY

A wind turbine power generating apparatus tends to increase in size to improve a power generation output, and an accompanying increase in a blade length is bringing about a further increase in a blade tip speed. Thus, erosion is more likely to proceed on a wind turbine blade, and it is becoming increasingly difficult to protect a wind turbine blade for a long time with a typical erosion-prevention technique. For instance, if a protection coating (Patent Document 1) or a protection layer of an elastic material or the like (Patent Document 2) is to be applied to a wind turbine blade to address erosion, the protection coating or the protection layer does not have a very high durability against rain drops, dust, or the like and thus may need to be reconstructed by conducting regular maintenance. If a protection tape (Patent Document 3) or a protection sheet (Patent Document 4) is to be applied to a wind turbine blade, the protection tape or the protection sheet may deteriorate with time in a weathered environment to fall off from the wind turbine blade, and thus may also need to be replaced by conducting regular maintenance.

However, a wind turbine power generating apparatus is often installed on a less accessible location such as on ocean or in mountains. Thus, it is desirable to provide a wind turbine power generating apparatus which requires less frequent maintenance, or even a maintenance-free wind turbine power generating apparatus.

Further, if a protector such as a protection coating and a protection tape is applied to a wind turbine blade, there is another problem of a risk of a decrease in aerodynamic performance of a wind turbine blade, depending on a surface shape of the protector. For instance, the thickness of a protection coating is difficult to handle, and thus a wind turbine blade may fail to have a designed airfoil in a region where a protection coating is applied, which may bring about a decrease in aerodynamic performance, despite that the airfoil is designed taking account of aerodynamic performance. Further, a protection tape or a protection sheet is likely to form a stepped portion if applied to a wind turbine blade, and this stepped portion may reduce aerodynamic performance.

Thus, a wind turbine blade is required to maintain high aerodynamic performance while having good durability.

An object of at least some embodiments of the present invention is to provide a wind turbine blade and a wind turbine power generating apparatus, and a method of producing or retrofitting the wind turbine blade, whereby it is possible to suppress erosion for a long time and to maintain high aerodynamic performance.

(1) A wind turbine blade according to some embodiments of the present invention comprises: a blade body extending from a blade root along a blade longitudinal direction toward a blade tip; and a metal strip provided to cover at least a leading edge at a side of the blade tip of the blade body so as to suppress erosion at the leading edge of the blade body.

With the above wind turbine blade (1), the metal strip is disposed so as to cover at least the leading edge at the side of the blade tip, where erosion is likely to occur, which makes it possible to improve an erosion-resistant property of the wind turbine blade.

A metal strip has a higher resistant property against erosion-causing substances such as rain drops and dust than a protection coating, a protection tape, or a protection sheet, and is less likely to fall off than a protection tape or a protection sheet. Thus, using the metal strip to address erosion makes it possible to reduce the maintenance frequency of the wind turbine blade, or make maintenance unnecessary in a lifetime of a wind turbine.

Further, a metal strip has a high form accuracy and thus can be attached to the wind turbine blade without reducing aerodynamic performance of the wind turbine blade. For instance, a metal strip is less likely to form a stepped portion when applied to the wind turbine blade, unlike a protection coating and a protection tape, and the thickness of a metal strip can be adjusted precisely. Thus, it is possible to maintain high aerodynamic performance of the wind turbine blade even with the metal strip attached to the wind turbine blade.

(2) In some embodiments, in the above configuration (1), the wind turbine blade further comprises a metal receptor which is connected to an end portion of the blade body opposite to the blade root and forms the blade tip. The metal strip is provided to overlap the metal receptor.

With the above configuration (2), with the metal strip disposed to overlap the metal receptor forming the blade tip, the metal strip and the metal receptor are electrically connected to each other. Thus, even if a lightning strikes the metal strip, lightning current flows through the metal receptor from the metal strip, which makes it possible to prevent damage to the wind turbine blade.

Further, with the metal strip overlapping with the metal receptor, it is possible to ensure electrical connection between the metal strip and the metal receptor with a simple configuration and to enhance the connection strength between the metal strip and the metal receptor.

(3) In an embodiment, in the above configuration (2), the wind turbine blade further comprises: metal foils electrically connected to the metal receptor and provided to extend on a pressure surface and a suction surface of the blade body along the blade longitudinal direction toward the blade root so as to direct lightning current from the metal receptor toward the blade root. The metal strip is electrically connected to the metal foils.

With the above configuration (3), the metal strip, the metal receptor, and the metal foils are electrically connected to one another, thereby forming a passage of lightning current, which makes it possible to prevent damage to the wind turbine blade due to a lightning strike.

Further, the metal strip and each metal foil extend in the blade longitudinal direction, and have a relatively short distance between each other. Thus, if the metal strip and each metal foil are insulated, an instant and large potential difference may be generated between the metal strip and the metal foil in response to a lightning strike on the metal strip to generate an electric arc, which may bring about a significant damage to the wind turbine blade. In this regard, according to the above configuration (3), the metal strip and each metal foil are electrically connected and thus potentially equalized, which makes it possible to avoid damage to the wind turbine blade due to generation of an arc in response to a lightning strike.

(4) In some embodiments, in the above configuration (2) or (3), the metal receptor comprises a recess at least at the leading edge of the blade tip, the recess engaging with an end portion of the metal strip, and the wind turbine blade further comprises a fastening member for fastening the end portion of the metal strip which is engaged with the recess to the metal receptor.

With the above configuration (4), the metal receptor and the metal strip are fastened to each other in a state where the end portion of the metal strip is engaging with the recess of the metal receptor. Accordingly, it is possible to avoid formation of a stepped portion corresponding to the thickness of the metal strip in a region where the metal receptor and the metal strip overlap, which makes it possible to maintain high aerodynamic performance of the wind turbine blade.

(5) In an embodiment, in the above configuration (4), a head portion of the fastening member forms a smooth surface with the metal strip around the head portion of the fastening member.

With the above configuration (5), it is possible to prevent the head portion of the fastening member from protruding outward from the surface of the wind turbine blade, which makes it possible to maintain high aerodynamic performance of the wind turbine blade.

(6) In some embodiments, in the above configuration (4) or (5), the fastening member includes either: (a) a bolt to be screwed into a screw hole formed in the metal receptor such that the screw hole has an opening at a bottom of the recess; or (b) a bolt to be inserted into an insertion hole which is formed in the metal receptor such that the insertion hole has an opening at a bottom of the recess, and a nut to be engaged with the bolt.

With the above configuration (6), the bolt is inserted in a thickness direction of the metal strip and the metal receptor, which makes it possible to establish a contacting state between the metal strip and the metal receptor securely to ensure electrical connection by adjusting the fastening strength of the bolt. Herein, using a metallic bolt makes it possible to establish electric connection between the metal strip and the metal receptor via the bolt even more securely.

(7) In some embodiments, in any of the above configurations (2) to (6), the metal strip comprises: a first region overlapping with and fixed to the metal receptor, and a second region positioned nearer to the blade root than the first region is and having a thickness of the metal strip smaller than that of the first region.

The tip speed of the wind turbine blade is higher at the side of the blade tip than at the side of the blade root. Thus, erosion is more likely to occur in the first region where the metal strip is fixed to the metal receptor forming the blade tip than in the second region disposed nearer to the blade root than the first region is. Thus, according to the above configuration (7), in the first region, where erosion is more likely to occur, the metal strip has a larger thickness than in the second region closer to the blade root. In contrast, in the second region, where erosion is less likely to occur, the metal strip has a reduced thickness for the purpose of weight reduction. Accordingly, with the thickness of the metal strip being varied in accordance with probability of occurrence of erosion, it is possible to balance weight reduction and achievement of an erosion-resistant property.

(8) In an embodiment, in any of the above configurations (4) to (7), the thickness of the metal strip within the second region of the metal strip increases toward the first region.

According to the above configuration (8), with the thickness of the metal strip being gradually varied in accordance with probability of occurrence of erosion, it is possible to balance weight reduction and achievement of an erosion-resistant property.

(9) In some embodiments, in any of the above configurations (4) to (8), the wind turbine blade further comprises an erosion-resistant layer arranged at the side of the blade root of the metal strip adjacent to the metal strip in the blade longitudinal direction in such a way that the erosion-resistant layer covers at least the leading edge of the blade body.

With the above configuration (9), in a region on the side of the blade root where erosion is relatively less likely to be a problem, the erosion-resistant layer is disposed so as to cover at least the leading edge of the blade body. An erosion-resistant layer in general has light weight, and thus the above configuration makes it possible to balance weight reduction and achievement of an erosion-resistant property.

(10) In some embodiments, in any of the above configurations (1) to (9), the wind turbine blade further comprises a deformable middle layer provided between the metal strip and the blade body.

With the above configuration (10), the middle layer, which is deformable and disposed between the metal strip and the blade body, can absorb a thermal-expansion difference between the metal strip and the blade body. Thus, it is possible to prevent deformation of the metal strip and the blade body, and deterioration of a joining condition of the metal strip and the blade body, due to a thermal-expansion difference between the metal strip and the blade body.

(11) In some embodiments, in any of the above configurations (1) to (10), the metal strip comprises a first width-directional end on the suction surface of the blade body and a second width-directional end on the pressure surface of the blade body, and the metal strip extends from the leading edge to the first width-directional end on the suction surface and to the second width-directional end on the pressure surface.

According to the above configuration (11), a side of the metal strip in the width direction extends from the leading edge of the blade body to the first width-directional end on the suction surface, and the opposite side of the metal strip in the width direction extends from the leading edge of the blade body to the second width-directional end on the pressure surface. Accordingly, it is possible to improve an erosion-resistant property in regions on the side of the suction surface and on the side of the pressure surface, including the leading edge of the blade body.

(12) In an embodiment, in the above configuration (11), the metal strip includes a width-directional region in which the thickness of the metal strip gradually decreases toward the first width-directional end and the second width-directional end.

According to the above configuration (12), the metal strip has the largest thickness at the leading edge or in the vicinity of the leading edge, where erosion is likely to occur, and has a thickness gradually decreasing in the width direction toward a region where erosion is relatively less likely to occur. Accordingly, with the thickness of the metal strip being varied in accordance with probability of occurrence of erosion, it is possible to balance weight reduction and achievement of an erosion-resistant property.

(13) In some embodiments, in any of the above configurations (1) to (12), the metal strip is an electrocast product.

According to the above configuration (13), the metal strip is an electrocast product and thus has a high form accuracy, which makes it possible to maintain high aerodynamic performance of the wind turbine blade and to readily obtain the metal strip with a high erosion-resistant property and less weight.

(14) A wind turbine power generating apparatus according to at least some embodiments of the present invention comprises: the wind turbine blade according to any one of the above (1) to (13); a hub attached with the wind turbine blade; and a generator driven by rotation of the hub.

With the above wind turbine power generating apparatus (14), it is possible to suppress erosion of a wind turbine blade for a long time and to maintain high aerodynamic performance of a wind turbine blade, which makes it possible to reduce maintenance frequency while maintaining a power generation efficiency of a wind turbine power generating apparatus.

(15) A method of producing or retrofitting a wind turbine blade according to at least some embodiments of the present invention comprises: a step of attaching a metal strip to a blade body which extends from a blade root along a blade longitudinal direction toward a blade tip in such a way that the metal strip covers at least a leading edge at the blade tip so as to suppress erosion at the leading edge of the blade body.

According to the above method (15), the metal strip is attached to the blade body of the wind turbine blade so as to cover a part of the blade body, which is at least the leading edge at the side of the blade tip. Thus, it is possible to produce or retrofit the wind turbine blade capable of suppressing erosion for a long time.

Advantageous Effects

According to at least one embodiment of the present invention, the metal strip is disposed so as to cover at least the leading edge at the side of the blade tip of the wind turbine blade, which makes it possible to suppress erosion of the wind turbine blade for a long time and to maintain high aerodynamic performance of the wind turbine blade.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Figure 1:
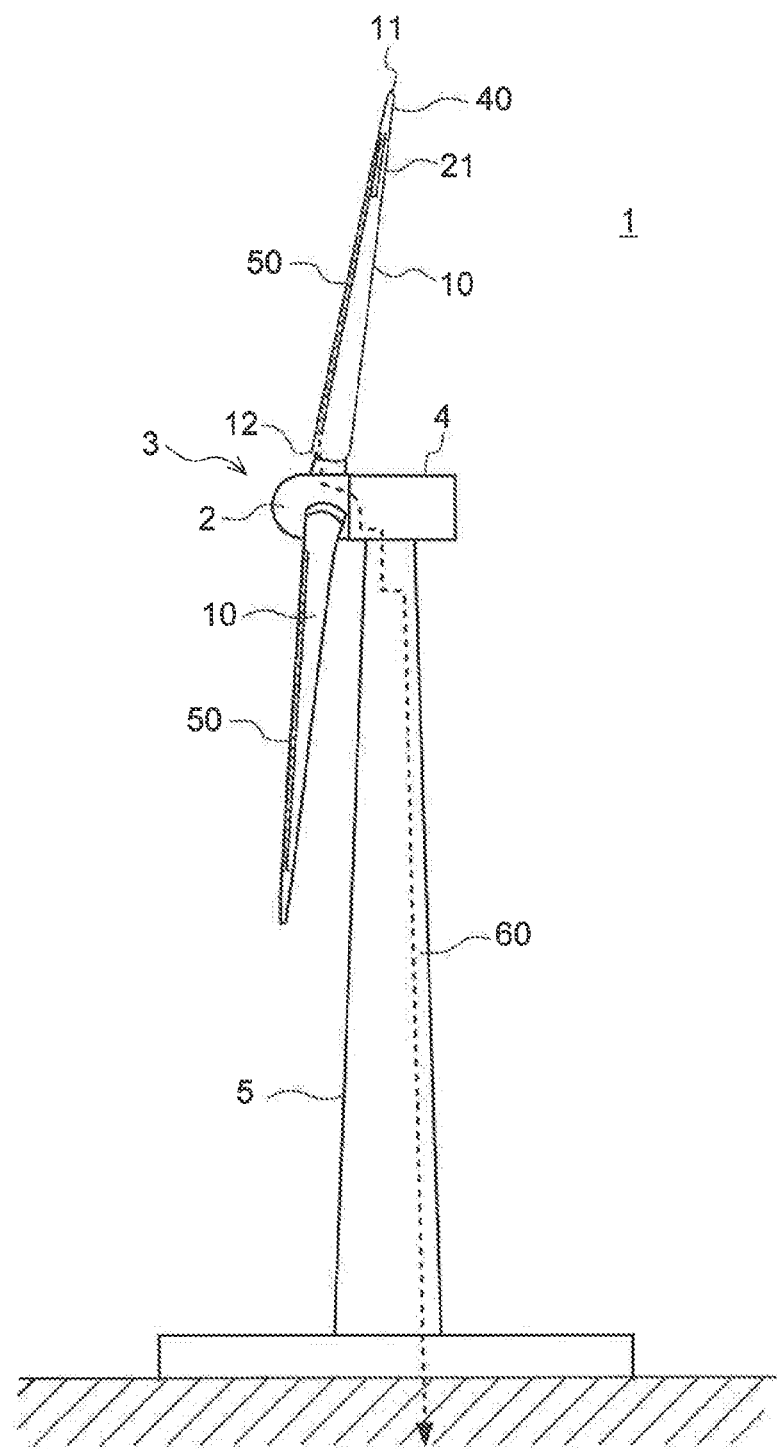
FIG. 1 is an overall configuration diagram of a wind turbine power generating apparatus according to an embodiment.

FIG. 1 is an overall configuration diagram of a wind turbine power generating apparatus 1.

As illustrated in FIG. 1, the wind turbine power generating apparatus 1 according to an embodiment includes at least one wind turbine blade 10, a hub 2 to which the wind turbine blade 10 is mounted, a generator (not depicted) driven by rotation of the hub 2, a nacelle 4 supporting a rotor 3 including the wind turbine blade 10 and the hub 2, and a tower 5 which supports the nacelle 4 revolvably.

For instance, a plurality (e.g. three) of the wind turbine blades 10 is mounted to the hub 2 so as to be disposed in a radial fashion. The wind turbine blades 10 have respective blade tips 11 disposed radially outside and centered at the hub 2, and respective blade roots 12 fixed to the hub 2 by optional fastening members. The tower 5 is disposed on ocean or on land.

In the wind turbine power generating apparatus 1, the rotor 3 including the wind turbine blades 10 rotates in response to wind, and rotation of the rotor 3 is inputted into a non-depicted generator, and thereby the generator generates electric power.

Next, the wind turbine blade 10 according to some embodiments will be described with reference to FIGS. 1 to 4.

Figure 2:
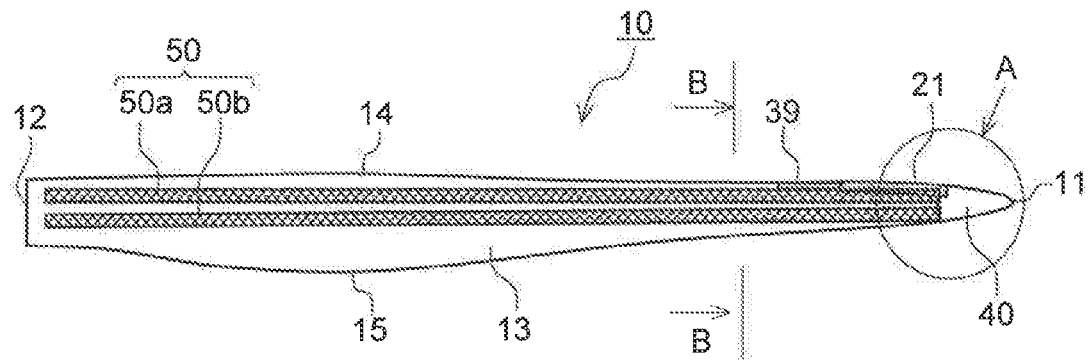
FIG. 2 is a planar view of a wind turbine blade according to an embodiment.
Figure 3:
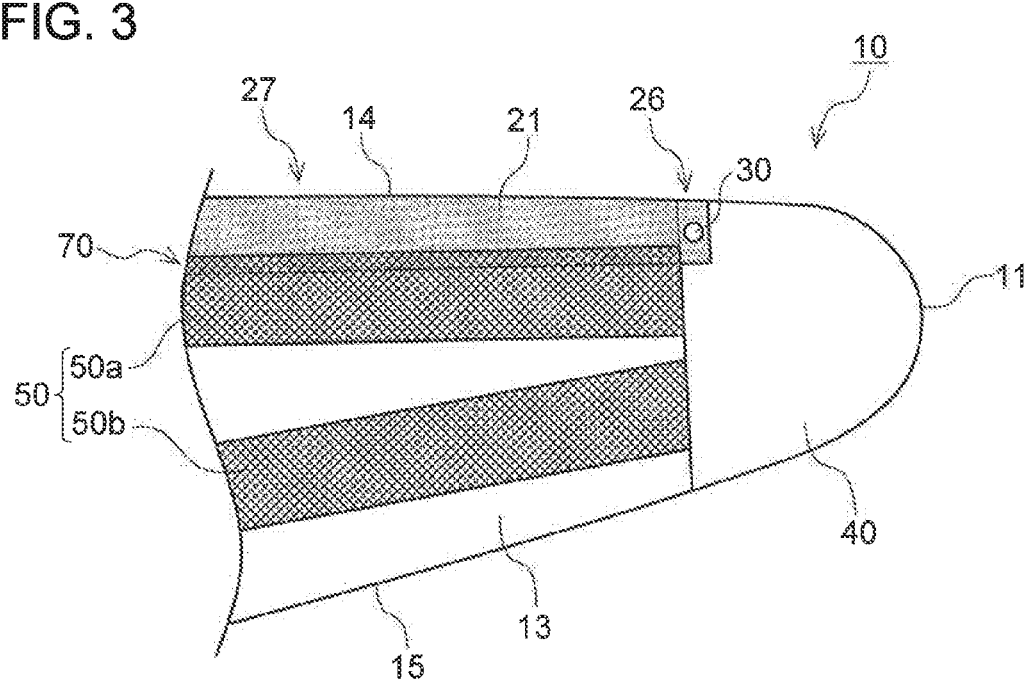
FIG. 3 is an enlarged view of section A of the wind turbine blade depicted in FIG. 2.
Figure 4:
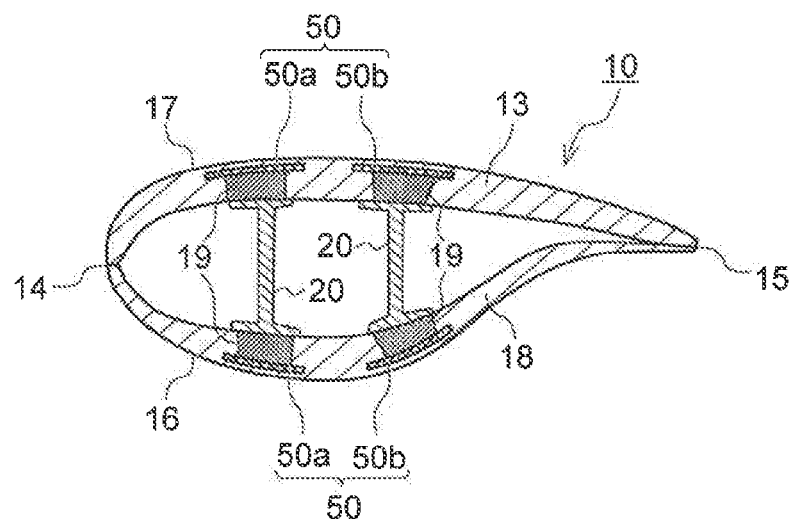
FIG. 4 is a cross-sectional view taken along line B-B of the wind turbine blade depicted in FIG. 2.

FIG. 2 is a planar view of the wind turbine blade 10 according to an embodiment. FIG. 3 is an enlarged view of section A of the wind turbine blade 10 depicted in FIG. 2. FIG. 4 is a cross-sectional view taken along line B-B of the wind turbine blade 10 depicted in FIG. 2.

As illustrated in FIGS. 1 to 4, the wind turbine blade 10 according to some embodiments includes a blade body 13 extending from the blade root 12 toward the blade tip 11 in a blade longitudinal direction. The blade body 13 includes a leading edge 14, a trailing edge 15, a pressure surface 16 (see FIG. 4), and a suction surface 17 (see FIG. 4), thereby forming an airfoil.

In the example of FIG. 4, the blade body 13 includes an airfoil forming member 18, a spar cap 19, and a shear web 20. The airfoil forming member 18 includes, for instance, a light-weight core material containing wood such as balsa wood or foaming resin such as polymethacrylimide (PMI), or a fiber-reinforced plastic material such as glass fiber-reinforced plastic. The spar cap 19 functions as a main reinforcing member for resisting a bending moment applied mainly to the wind turbine blade 10, and extends along the shear web 20 from the side of the blade root 12 to the side of the blade tip 11 in the blade longitudinal direction. A plurality of the spar caps 19 may be provided, and the spar caps 19 are formed of carbon fiber-reinforced plastic (CFRP), for instance. The shear web 20 is disposed between a spar cap 19 on the side of the pressure surface 16 and a spar cap 19 on the side of the suction surface 17, the spar caps 19 facing each other, and extends from the side of the blade root 12 to the side of the blade tip 11 in the blade longitudinal direction. In the illustrated example, two spar caps 19 are disposed on each of the pressure surface 16 and the suction surface 17, and two shear webs 20 are provided corresponding to the two pairs of spar caps 19. The number and position of the spar caps 19 or the shear webs 20 are not limited to this. For instance, one spar cap 19 may be disposed on each of the pressure surface 16 and the suction surface 17, and one shear web 20 may be provided corresponding to the one pair of spar caps 19. Alternatively, three spar caps 19 may be disposed on each of the pressure surface 16 and the suction surface 17, and three shear web 20 may be provided corresponding to the three pairs of spar caps 19.

As illustrated in FIGS. 1 to 3, the wind turbine blade 10 according to some embodiments further includes a metal strip 21 for suppressing erosion on the leading edge 14 of the blade body 13. The metal strip 21 is disposed so as to cover at least the leading edge 14 at the side of the blade tip 11 in the blade body 13. The metal strip 21 may be attached to the blade body 13 by using a joining unit such as an adhesive agent and a fastening member like a bolt. Specifically, the metal strip 21 is formed to have a longer side extending in the blade longitudinal direction, for instance. Further, the metal strip 21 has a cross section curved along a shape of the leading edge 14 taken in a direction orthogonal to the blade longitudinal direction.

With the above configuration, the metal strip 21 is disposed so as to cover at least the leading edge 14 at the side of the blade tip 11, where erosion is likely to occur, which makes it possible to improve an erosion-resistant property of the wind turbine blade 10.

The metal strip 21 has a higher resistant property against erosion-causing substances such as rain drops and dust than a protection coating, a protection tape, or a protection sheet, and is less likely to fall off than a protection tape or a protection sheet. Thus, with the metal strip 21 being used to address erosion, it is possible to reduce the maintenance frequency of the wind turbine blade 10, or make maintenance unnecessary in a lifetime of a wind turbine.

Further, the metal strip 21 has a high form accuracy and thus can be attached to the wind turbine blade 10 without reducing aerodynamic performance of the wind turbine blade 10. Specifically, the metal strip 21 is less likely to form a stepped portion when applied to the wind turbine blade 10, unlike a protection coating and a protection tape, and the thickness of the metal strip 21 can be adjusted precisely. Thus, it is possible to maintain high aerodynamic performance of the wind turbine blade 10 even with the metal strip 21 attached to the wind turbine blade 10.

The wind turbine blade 10 with the above configuration may further include a lightning-protection structure.

As illustrated in FIGS. 1 to 4, the wind turbine blade 10 according to an embodiment is provided with a lightning-protection structure that comprises a metal receptor 40 connected to the blade body 13 at an end portion opposite from the blade root 12 so as to form the blade tip 11.

The metal receptor 40 is disposed as a piece forming the blade tip 11 to function as a lightning receptor. The metal receptor 40 may have a hollow shape which has a void section inside (see FIG. 7A), or a solid shape which has substantially no void inside (see FIG. 7B).

Specifically, the wind turbine blade 10 is provided with a lightning-protection structure that comprises the above described metal receptor 40, metal foils 50 (50a, 50b) electrically connected to the metal receptor 40, and a down-conductor 60 (see FIG. 1) electrically connected to the metal foils 50.

The metal foils 50 have an end disposed on the side of the blade tip 11 so as to contact the metal receptor 40, and extend on the pressure surface 16 and the suction surface 17 of the blade body 13 along the blade longitudinal direction from the metal receptor 40 toward the blade root 12, thereby directing lightening current from the metal receptor 40 toward the blade root 12. In the examples depicted in FIGS. 2 to 4, two spar caps 19 are disposed on each of the pressure surface 16 and the suction surface 17, and two metal foils 50 are disposed on each of the pressure surface 16 and the suction surface 17 so as to cover the spar caps 19. The metal foils 50 may be buried inside the airfoil forming member 18, without being exposed on an outer surface of the blade body 13. For instance, the metal foils 50 may have a surface covered by a resin material such as glass fiber-reinforced plastic.

The down-conductor 60 (see FIG. 1) comprises a conductive wire, for instance, to direct lightning current flowing through the metal foils 50 to outside of the wind turbine power generating apparatus 1, such as the earth, through the nacelle 4 and the tower 5.

In the wind turbine blade 10 with the above configuration, as illustrated in FIG. 3, the metal strip 21 is disposed so as to overlap with the metal receptor 40.

In this case, with the metal strip 21 disposed to overlap with the metal receptor 40 forming the blade tip 11, the metal strip 21 and the metal receptor 40 are electrically connected to each other. Thus, if a lightning strikes the metal strip 21, lightning current flows through the metal receptor 40 from the metal strip 21, which makes it possible to prevent damage to the wind turbine blade 10.

Further, with the metal strip 21 overlapping with the metal receptor 40, it is possible to ensure electrical connection between the metal strip 21 and the metal receptor 40 with a simple configuration and to enhance the connection strength between the metal strip 21 and the metal receptor 40.

Further, the metal strip 21 is electrically connected to the metal foils 50. As illustrated in FIGS. 2 and 3, while two metal foils 50 are disposed on each of the pressure surface 16 and the suction surface 17, the metal strip 21 is directly connected to the metal foils 50$a$ on the side of the leading edge 14.

In a configuration example, an overlapping region 70 (see FIG. 3) is formed, where the metal foil 50$a$ and the metal strip 21 overlap with each other, and the overlapping region 70 electrically connects the metal foil 50$a$ and the metal strip 21. In the overlapping region 70, the metal foil 50$a$ and the metal strip 21 may be joined to each other by a conductive adhesive agent. In this case, the conductive adhesive agent may be applied in the overlapping region 70 in the blade longitudinal direction. Accordingly, it is possible to achieve electrically connection between the metal foil 50$a$ and the metal strip 21 even more securely.

It should be noted that the metal strip 21 may be electrically connected to the metal foil 50 via another conductive material (excluding the metal receptor 40).

With the above configuration, the metal strip 21, the metal receptor 40, and the metal foils 50 are electrically connected to one another, thereby forming a passage of lightning current, which makes it possible to prevent damage to the wind turbine blade 10 due to a lightning strike.

Further, the metal strip 21 and each metal foil 50$a$ both extend in the blade longitudinal direction, and have a relatively short distance between each other. Thus, if the metal strip 21 and the metal foil 50$a$ are insulated, an instant and large potential difference may be generated between the metal strip 21 and the metal foil 50$a$ in response to a lightning strike on the metal strip 21 to generate an electric arc, which may bring about a significant damage to the wind turbine blade 10. In this regard, according to the above configuration, the metal strip 21 and the metal foil 50$a$ are electrically connected and thus potentially equalized, which makes it possible to avoid damage due to generation of an arc in response to a lightning strike.

Figure 5:
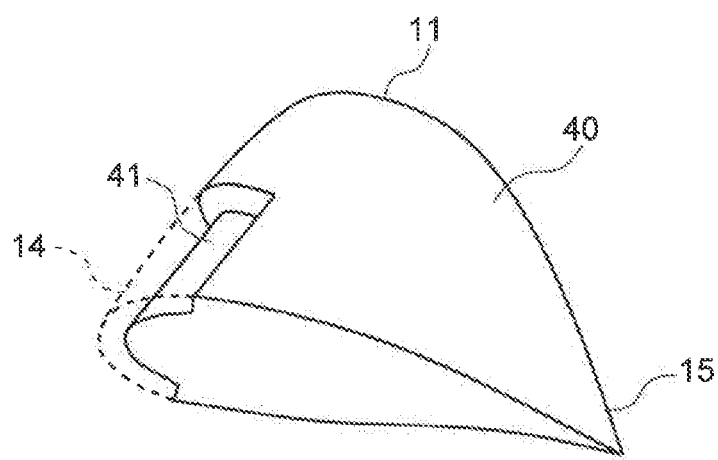
FIG. 5 is a perspective view of a metal receptor according to an embodiment.
Figure 6:
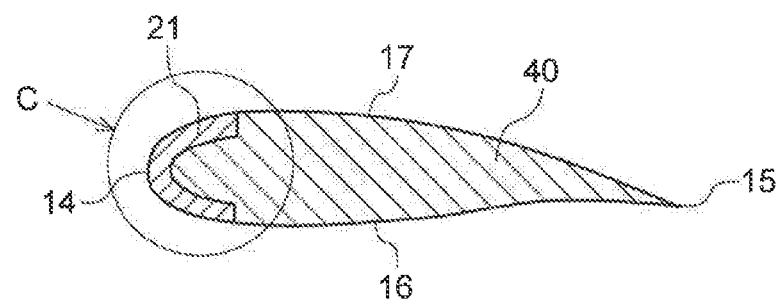
FIG. 6 is a cross-sectional view of a metal receptor and a metal strip according to an embodiment.
Figure 7A:
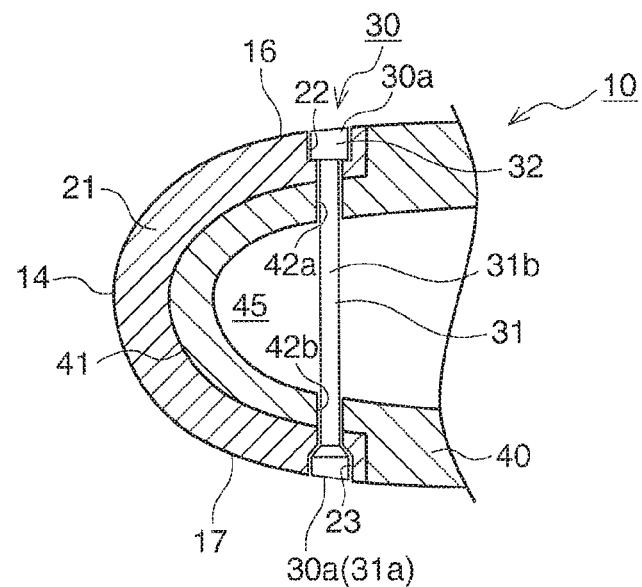
FIG. 7A is a cross-sectional view of a joint part between a metal receptor and a metal strip according to an embodiment.
Figure 7B:
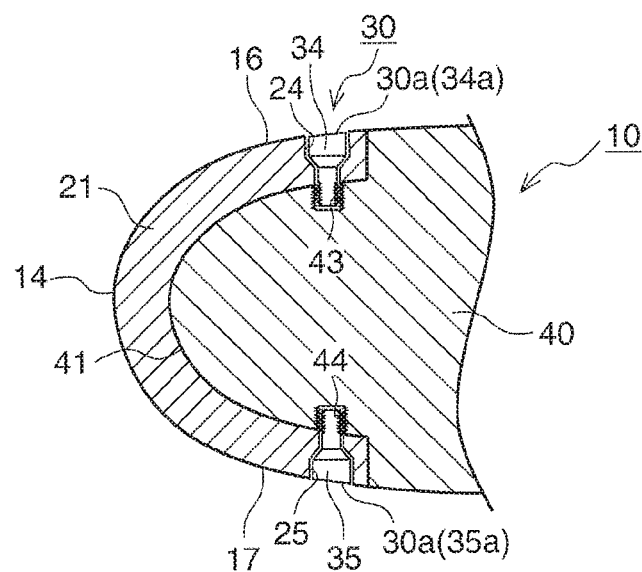
FIG. 7B is a cross-sectional view of a joint part between a metal receptor and a metal strip according to another embodiment.

FIG. 5 is a perspective view of the metal receptor 40 according to an embodiment. FIG. 6 is a cross-sectional view of the metal receptor 40 and the metal strip 21 according to an embodiment. FIG. 6 is a cross section orthogonal to the blade longitudinal direction. FIG. 7A is a cross-sectional view of a joint part (corresponding to section C of FIG. 6) between the metal receptor 40 and the metal strip 21 according to an embodiment. FIG. 7B is a cross-sectional view of a joint part (corresponding to section C of FIG. 6) between the metal receptor 40 and the metal strip 21 according to another embodiment.

As illustrated in FIGS. 6, 7A and 7B, in an embodiment, the metal receptor 40 has a recess 41 to be engaged with an end portion of the metal strip 21, at least on the leading edge 14 of the blade tip 11. In this case, in a region where the metal strip 21 and the metal receptor 40 overlap, a depth of the recess 41 and a thickness of the metal strip 21 may be substantially the same. Further, in state where the end portion of the metal strip 21 is engaged with the recess 41, the end portion of the metal strip 21 is fastened to the metal receptor 40 by a fastening member 30. The fastening member 30 may comprise a bolt 31 and a nut 32 (see FIG. 7A), or bolts 34, 35 (see FIG. 7B).

With the above configuration, the metal receptor 40 and the metal strip 21 are fastened to each other in a state where the end portion of the metal strip 21 is engaging with the recess 41 of the metal receptor 40. Accordingly, it is possible to avoid formation of a stepped portion corresponding to the thickness of the metal strip 21 in a region where the metal receptor 40 and the metal strip 21 overlap, and thus to maintain high aerodynamic performance of the wind turbine blade 10. Further, if the depth of the recess 41 and the thickness of the metal strip 21 are substantially the same, an exterior surface of the wind turbine blade 10 is smooth in a region where the metal receptor 40 and the metal strip 21 overlap, which makes it possible to maintain aerodynamic performance of the wind turbine blade 10 at an even higher level.

Further, as illustrated in FIGS. 7A and 7B, a head portion 30$a$ of the fastening member 30 may form a smooth surface with the metal strip 21 around the head portion 30$a$.

Accordingly, it is possible to prevent the head portion 30$a$ of the fastening member 30 from protruding outward from the surface of the wind turbine blade 10, which makes it possible to maintain high aerodynamic performance of the wind turbine blade 10.

Each embodiment will now be described in detail.

In a configuration example depicted in FIG. 7A, the metal receptor 40 is formed into a hollow shape with a hollow space 45 inside. Further, the metal receptor 40 has insertion holes 42$a$, 42$b$ which have openings into a bottom surface of the recess 41. Specifically, the insertion holes 42$a$, 42$b$ of the metal receptor 40 are respectively disposed on the side of the pressure surface 16 and on the side of the suction surface 17. Each of the insertion holes 42$a$, 42$b$ is formed through the metal receptor 40 so that the recess 41 and the hollow space 45 communicate with each other.

In an embodiment, the fastening member 30 includes a bolt 31 and a nut 32 screwed to the bolt 31. The bolt 31 is inserted through both of the insertion holes 42$a$, 42$b$.

Further, the metal strip 21 also have insertion holes 22, 23 formed respectively on end portions on the side of the pressure surface 16 and on the side of the suction surface 17. The insertion holes 22, 23 of the metal strip 21 are disposed on positions corresponding to those of the insertion holes 42$a$, 42$b$ of the metal receptor 40.

The bolt 31 has a head portion 31$a$ and a shaft portion 31$b$. The shaft portion 31$b$ has a length corresponding to the thickness of the blade tip 11 formed by the metal receptor 40 and the metal strip 21 engaged to each other, and a diameter slightly smaller than that of the insertion holes 42a, 42b.

In a state where the bolt 31 is inserted through the insertion holes 42a, 42b and the insertion holes 22, 23 from one of the side of the pressure surface 16 or the side of the suction surface 17, the nut 32 is screwed to an end portion of the bolt 31 from the other one of the side of the pressure surface 16 or the side of the suction surface 17. Accordingly, the metal receptor 40 and the metal strip 21 are nipped between the head portion 31a of the bolt 31 and the nut 32, thereby being fastened.

In a state where the metal receptor 40 and the metal strip 21 are fastened, the head portion 31a of the bolt 31 and the nut 32 form a smooth surface with respective parts of the metal strip 21 surrounding the head portion 31a and the nut 32.

As illustrated in FIG. 7B, if the metal receptor is formed into a solid shape without an internal hollow space, the metal receptor has insertion holes formed through the metal receptor from the side of the pressure surface toward the side of the suction surface of the wind turbine blade, and one bolt is inserted through each one of the insertion holes.

As illustrated in FIG. 7B, in another embodiment, the fastening member 30 comprises bolts 34, 35 to be screwed to screw holes 43, 44 formed on the metal receptor 40 so as to have openings into a bottom surface of the recess 41.

The screw hole 43 of the metal receptor 40 is disposed on the side of the pressure surface 16, and the screw hole 44 is disposed on the side of the suction surface 17.

Further, the metal strip 21 also have insertion holes 24, 25 formed respectively on end portions on the side of the pressure surface 16 and on the side of the suction surface 17. The insertion holes 24, 25 of the metal strip 21 are disposed on positions corresponding to those of the screw holes 43, 44 of the metal receptor 40.

The bolts 34, 35 are configured to penetrate through the insertion holes 24, 25 of the metal strip 21 to be screwed to the screw holes 43, 44 of the metal receptor 40.

On the pressure surface 16 and the suction surface 17, the bolts 34, 35 are inserted through the insertion holes 24, 25 to be screwed to the screw holes 43, 44, respectively. Accordingly, the metal receptor 40 and the end portion of the metal strip 21 are fastened to each other on each of the pressure surface 16 and the suction surface 17.

In a state where the metal receptor 40 and the metal strip 21 are fastened, the head portions 34a, 35a of the bolts 34, 35 form smooth surfaces with respective parts of the metal strip 21 surrounding the head portions 34a, 35a.

In the configurations depicted in FIGS. 7A and 7B, the bolts 31, 34, 35 are inserted in a thickness direction of the metal strip 21 and the metal receptor 40, which makes it possible to establish a contacting state between the metal strip 21 and the metal receptor 40 securely by adjusting the fastening strength of the bolts 31, 34, 35, to ensure electrical connection. Herein, using metallic bolts 31, 34, 35 makes it possible to establish electric connection even more securely between the metal strip 21 and the metal receptor 40 via the bolts 31, 34, 35.

Figure 8A:
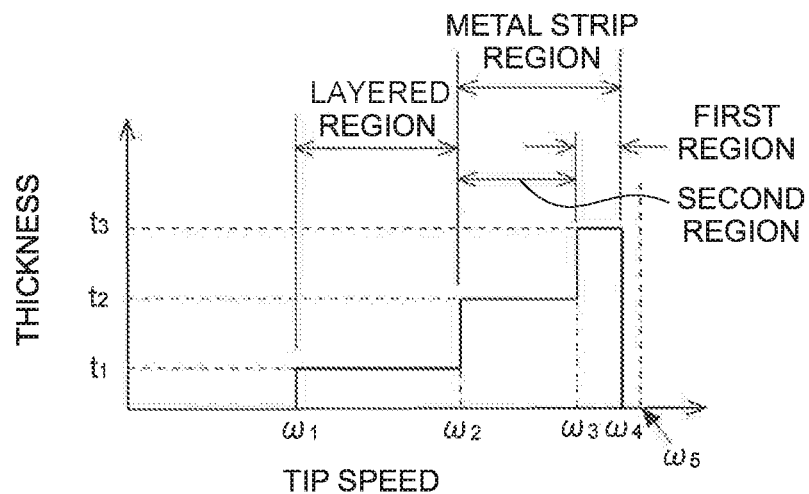
FIG. 8A is a chart showing a relationship between a tip speed of a wind turbine blade and a thickness of a metal strip according to an embodiment.
Figure 8B:
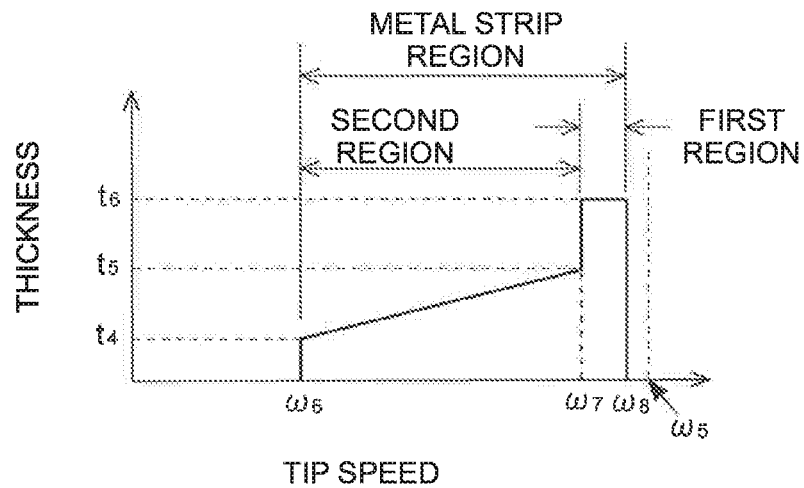
FIG. 8B is a chart showing a relationship between a tip speed of a wind turbine blade and a thickness of a metal strip according to another embodiment.

FIG. 8A is a graph showing a relationship between a tip speed of the wind turbine blade 10 and a thickness of the metal strip 21 according to an embodiment. FIG. 8B is a graph showing a relationship between a tip speed of the wind turbine blade 10 and a thickness of the metal strip 21 according to another embodiment. In FIGS. 8A and 8B, a tip speed of the wind turbine blade 10 at a certain position is proportional to a radial-directional position on the rotor 3 (see FIG. 1), i.e., a distance from the blade root 12 in the blade longitudinal direction. Thus, the tip speed on x-axis corresponds to a blade-longitudinal-directional position.

As depicted in FIGS. 3, 8A, and 8B, according to some embodiments, the wind turbine blade 10 includes a first region 26 where the metal strip 21 overlaps with the metal receptor 40 and is fixed to the metal receptor 40, and a second region 27 where the thickness of the metal strip 21 is smaller than that in the first region 26, the second region 27 being disposed closer to the blade root 12 than the first region 26 is.

The tip speed of the wind turbine blade 10 is higher at the side of the blade tip 11 than at the side of the blade root 12. Thus, erosion is more likely to occur in the first region 26, where metal strip 21 is fixed to the metal receptor 40 forming the blade tip 11, than in the second region 27 disposed closer to blade root 12 than the first region 26 is. Thus, in the first region 26, where erosion is more likely to occur, the metal strip 21 has a larger thickness than in the second region 27 closer to the blade root 12. In contrast, in the second region 27, where erosion is less likely to occur, the metal strip 21 has a reduced thickness for the purpose of weight reduction. Accordingly, with the thickness of the metal strip 21 being varied in accordance with probability of occurrence of erosion, it is possible to balance weight reduction and achievement of an erosion-resistant property.

In an example depicted in FIG. 8, the thickness of the metal strip 21 in the first region 26 is substantially constant in the blade longitudinal direction, and the thickness of the metal strip 21 in the second region 27 is substantially constant in the blade longitudinal direction but thinner than that in the first region 26. In other words, there is a stepped portion on the boundary between the first region 26 and the second region 27. The metal strip 21 has a front surface and a back surface, and the stepped portion is disposed on the back surface facing the blade body 13. Thus, the front surface (which is an exterior surface of the wind turbine blade 10) of the metal strip 21 does not have a stepped portion, and thus aerodynamic performance of the wind turbine blade 10 is not reduced.

Further, in an example depicted in FIG. 8A, the wind turbine blade 10 further includes a layered region (corresponding to an erosion-resistant layer 39 depicted in FIG. 2) disposed adjoining to the metal strip 21 in the blade longitudinal direction and on the side of the blade root 12 of the metal strip 21, so as to cover at least the leading edge 14 of the blade body 13. Specifically, in a region on the side of the blade root 12 where erosion is relatively less likely to be a problem, the erosion-resistant layer 39 (see FIG. 2) is disposed so as to cover at least the leading edge 14 of the blade body 13. The erosion-resistant layer 39 (see FIG. 2) normally has light weight, and thus the above configuration makes it possible to balance weight reduction and achievement of an erosion-resistant property.

In an embodiment illustrated in FIG. 8A, the layered region is disposed in a region where the tip speed is not less than $\omega 1$ and less than $\omega 2$, and a layer of thickness t1 is disposed in the layered region. For instance, if the tip speed $\omega 5$ of the blade tip 11 (tip speed at a farthest end) is 90 m/s, the tip speed $\omega 1$ of a lower limit of the layered region is 50 m/s and the tip speed $\omega 2$ of an upper limit of the layered region is 80 m/s. In this layered region, the thickness t1 of the layer may be approximately 0.3 mm. As described above, the layered region may start from a position of approximately 50 m/s at which erosion needs to be addressed by some kind of measure.

Further, the second region is disposed adjoining to the layered region, in a region where the tip speed is not less than ω2 and less than ω3, which is a region with a higher tip speed than the layered region, and has a thickness t2. For instance, if the tip speed ω5 of the blade tip 11 is 90 m/s, the tip speed ω2 of a lower limit of the second region is 80 m/s and the tip speed ω3 of an upper limit of the second region is 87 m/s. The thickness t2 of the second region may be approximately 1.0 mm Specifically, at a tip speed of 80 m/s or higher, erosion may not be sufficiently addressed by a layered region alone, and thus the second region and the first region are provided in a region where the tip speed is 80 m/s or higher, as illustrated in FIG. 8A.

Further, the first region is disposed adjoining to the second region, in a region where the tip speed is from ω3 to ω4, which is a region with a higher tip speed than the second region, and has a thickness t3. For instance, if the tip speed ω5 of the blade tip 11 is 90 m/s, the tip speed ω3 of a lower limit of the first region is 87 m/s and the tip speed ω4 of an upper limit of the first region is 89 m/s. The thickness t3 of the first region may be approximately 5.0 mm.

In the above wind turbine blade 10, in the context of cost reduction, the length of the layered region in the blade longitudinal direction may be longer than that of a metal-strip region (the first region and the second region).

In an example depicted in FIG. 8B, the thickness of the metal strip 21 in the first region 26 is substantially constant in the blade longitudinal direction, and the thickness of the metal strip 21 in the second region 27 increases toward the first region 26 in the blade longitudinal direction. Also in this case, there is a stepped portion on the boundary between the first region 26 and the second region 27 on the back surface of the metal strip 21, similarly to FIG. 8A.

Accordingly, with the thickness of the metal strip 21 being gradually varied in accordance with probability of occurrence of erosion, it is possible to balance weight reduction and achievement of an erosion-resistant property.

In another embodiment illustrated in FIG. 8, the second region is disposed in a region where the tip speed is not less than ω6 and less than ω7, and in this region the thickness gradually increases from t4 to t5 toward the blade tip 11. For instance, if the tip speed ω5 of the blade tip 11 is 90 m/s, the tip speed ω6 of a lower limit of the second region is 50 m/s and the tip speed ω7 of an upper limit of the second region is 87 m/s. The thickness t4 of a lower limit of the second region may be 0.3 mm, and the thickness t5 of an upper limit of the second region may be 1.0 mm.

The first region is disposed adjoining to the second region, in a region where the tip speed is not less than ω7 and less than ω8, which is a region with a higher tip speed than the second region, and has a thickness t6. For instance, if the tip speed ω5 of the blade tip 11 is 90 m/s, the tip speed ω7 of a lower limit of the first region is 87 m/s and the tip speed ω8 of an upper limit of the first region is 89 m/s (a value less than 90 m/s). The thickness t6 of the first region may be approximately 5.0 mm.

Further, while measurements described in the above description referring to FIGS. 8A and 8B are based on an exemplary condition that the tip speed ω5 of the blade tip 11 is 90 m/s, ω1, ω2, or ω6 may be the same as the above measurements and ω3 or ω7 may be in a range of from 97 to 99 m/s if the tip speed ω5 of the blade tip 11 is 100 m/s. In other words, for different tip speeds of the blade tip 11, the layered region and the second region may have substantially constant starting points (a blade-root side end portion of each region with respect to the blade longitudinal direction) regardless of the tip speed, but first region may have different starting points (a blade-root side end portion of the first region with respect to the blade longitudinal direction) in accordance with the tip speed.

Figure 9A:
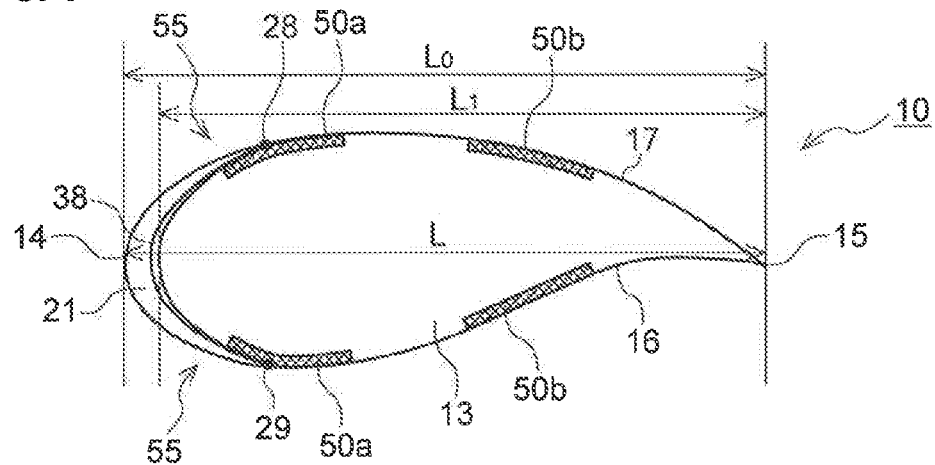
FIG. 9A is a schematic cross-sectional view of a wind turbine blade including a metal strip according to an embodiment.
Figure 9B:
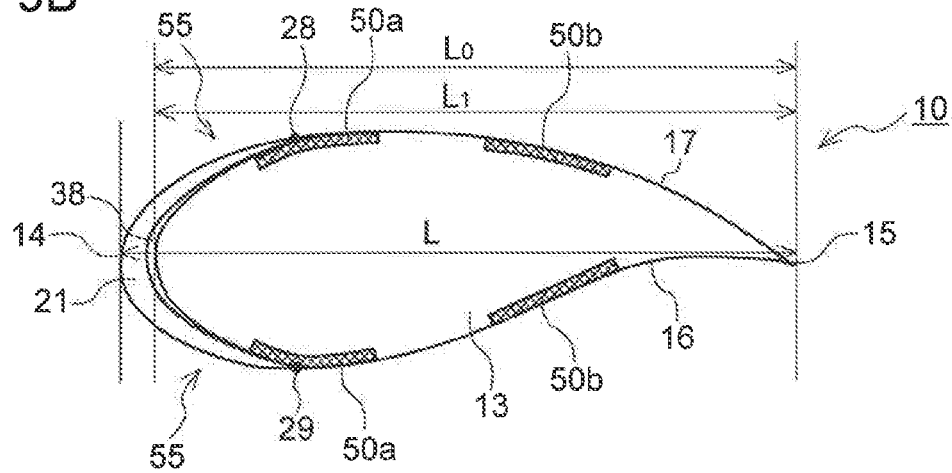
FIG. 9B is a schematic cross-sectional view of a wind turbine blade including a metal strip according to another embodiment.
Figure 9C:
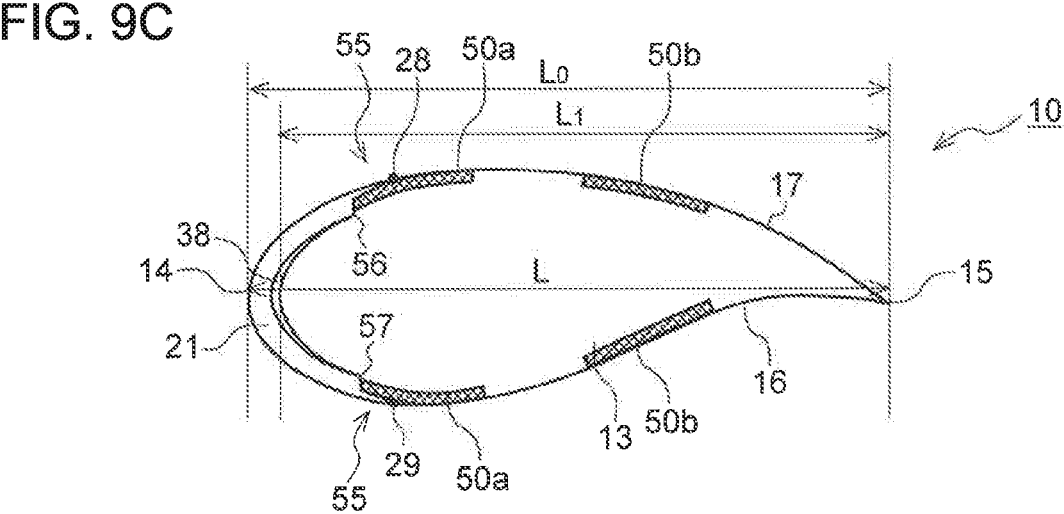
FIG. 9C is a schematic cross-sectional view of a wind turbine blade including a metal strip according to yet another embodiment.

FIG. 9A is a schematic cross-sectional view of the wind turbine blade 10 including the metal strip 21 according to an embodiment. FIG. 9B is a schematic cross-sectional view of the wind turbine blade 10 including the metal strip 21 according to another embodiment. FIG. 9C is a schematic cross-sectional view of the wind turbine blade 10 including the metal strip 21 according to yet another embodiment. The cross sectional views of the wind turbine blade 10 in FIGS. 9A to 9C are taken along a direction orthogonal to the blade longitudinal direction, and components in a cross section of the wind turbine blade 10 other than the metal strip 21 and the metal foils 50a, 50b are not depicted in the drawings.

As depicted in FIGS. 9A to 9C, the metal strip 21 includes a first width-directional end 28 disposed on the suction surface 17 of the blade body 13 and a second width-directional end 29 disposed on the pressure surface 16 of the blade body 13.

Further, the metal strip 21 extends from the leading edge 14 to the first width-directional end 28 and the second width-directional end 29 on the suction surface 17 and the pressure surface 16. The metal foils 50a may be disposed between the metal strip 21 and the blade body 13. Specifically, the metal strip 21 and the metal foils 50a are disposed in a state of partial overlap so as to be in direct contact with each other.

According to this configuration, a side of the metal strip 21 in the width direction extends from the leading edge 14 of the blade body 13 to the first width-directional end 28 on the suction surface 17, and the opposite side of the metal strip 21 in the width direction extends from the leading edge 14 of the blade body 13 to the second width-directional end 29 on the pressure surface 16. Accordingly, it is possible to improve an erosion-resistant property in regions on the side of the suction surface and the side of the pressure surface, including the leading edge 14 of the blade body 13.

Further, the metal strip 21 includes a width-directional region 55 in which the thickness of the metal strip 21 gradually decreases toward the first width-directional end 28 and the second width-directional end 29.

Figure 10A:
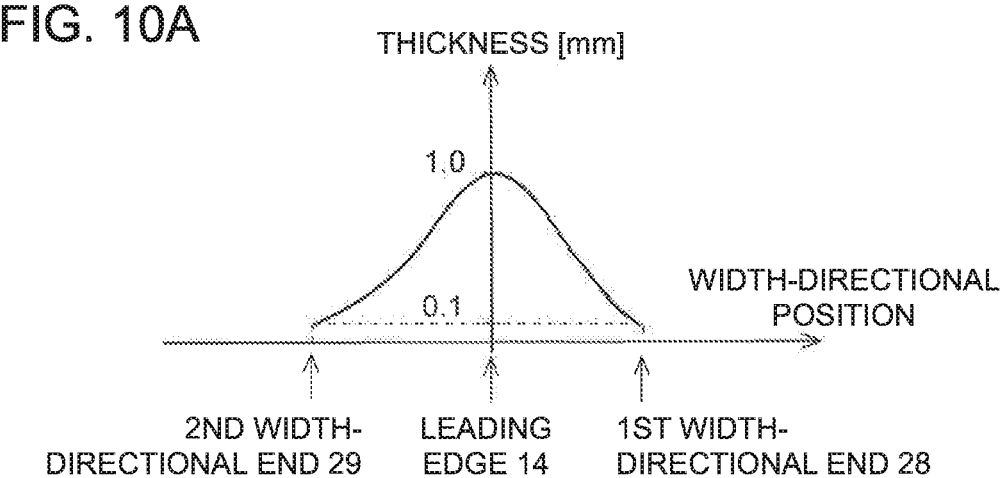
FIG. 10A is a chart showing a relationship between a width-directional position and a thickness of the wind turbine blade depicted in FIG. 9A.

In an example illustrated in FIGS. 9A and 10A, the width-directional region 55 includes a region from the leading edge 14 to the first width-directional end 28 and a region from the leading edge 14 to the second width-directional end 29.

Figure 10B:
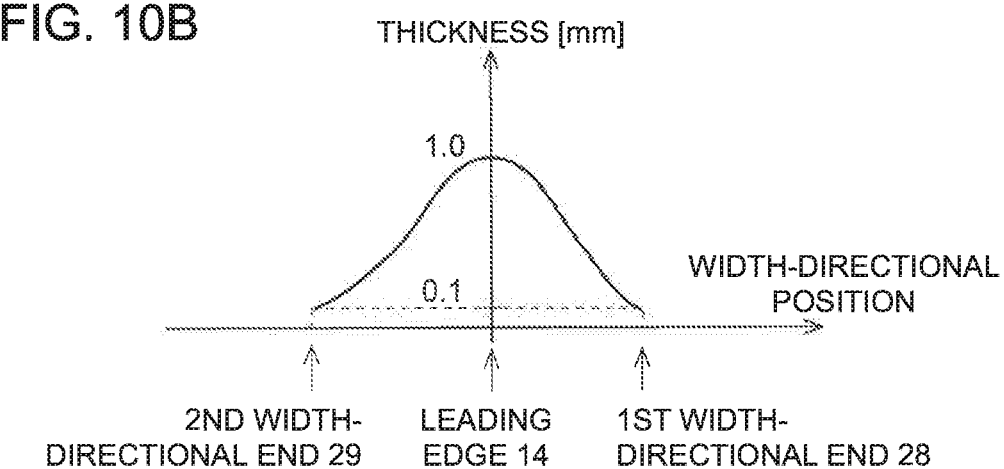
FIG. 10B is a chart showing a relationship between a width-directional position and a thickness of the wind turbine blade depicted in FIG. 9B.

Similarly, in an example illustrated in FIGS. 9B and 10B, the width-directional region 55 includes a region from the leading edge 14 to the first width-directional end 28 and a region from the leading edge 14 to the second width-directional end 29.

Figure 10C:
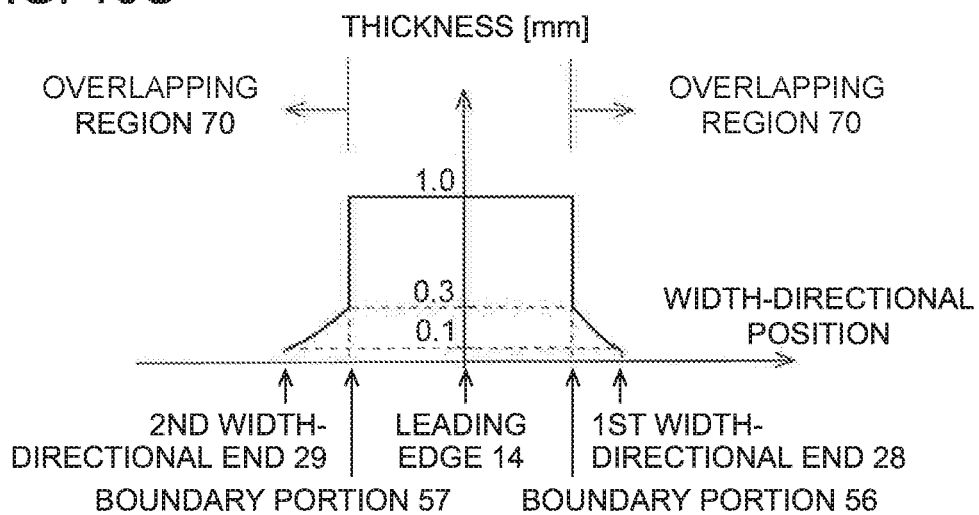
FIG. 10C is a chart showing a relationship between a width-directional position and a thickness of the wind turbine blade depicted in FIG. 9C.

In an example illustrated in FIGS. 9C and 10C, the thickness of the metal strip 21 changes in a stepped pattern on the boundary portion 56 on the side of the suction surface 17 with respect to the leading edge 14, and on the boundary portion 57 on the side of the pressure surface 16 with respect to the leading edge 14. The thickness of the metal strip 21 is substantially constant in a region between the boundary portion 56 and the boundary portion 57, the region including the leading edge 14. Further, a region from the boundary portion 56 to the first width-directional end 28 and a region from the boundary portion 57 to the second width-directional end 29 are the width-directional region 55, in which the thickness of the metal strip 21 gradually decreases toward the first width-directional end 28 and the second width-directional end 29.

For instance, the thickness of the metal strip 21 at the first width-directional end 28 or the second width-directional end 29 may be from 0.05 to 0.2 times (in the depicted drawing, 0.1 times) the thickness of the metal strip 21 at the leading edge 14 (or a position where the metal strip 21 has the largest thickness.)

According to the configurations depicted in FIGS. 9A to 9C and FIGS. 10A to 10C, the metal strip 21 has the largest thickness at the leading edge 14, where erosion is likely to occur, and has a thickness gradually decreasing in the width direction toward a region where erosion is relatively less likely to occur. Accordingly, with the thickness of the metal strip 21 being varied in accordance with probability of occurrence of erosion, it is possible to balance weight reduction and achievement of an erosion-resistant property.

Further, in an example depicted in FIGS. 9C and 10C, in the width-directional region 55 from the boundary portion 56 to the first width-directional end 28 and in the width-directional region 55 from the boundary portion 57 to the second width-directional end 29, the metal strip 21 has a smaller thickness than in a region between the boundary portion 56 and the boundary portion 57, the region including the leading edge 14. The thickness of the metal strip 21 at the boundary portion 57 may be from 0.2 to 0.4 times (in the depicted example, 0.3 times) the thickness of the metal strip 21 in a region between the boundary portion 56 and the boundary portion 57, the region including the leading edge 14.

In this case, in the width-directional regions 55, the metal strip 21 may overlap with the metal foils 50a. Specifically, the overlapping region 70 at which the metal foil 50a and the metal strip 21 overlap depicted in FIG. 3 may be disposed in the width-directional regions 55 of the metal strip 21. Accordingly, it is possible to prevent the thickness from becoming larger in the overlapping region 70 at which the metal foils 50a and the metal strip 21 overlap than in other regions, and to obtain a smooth surface of the wind turbine blade 10, which makes it possible to maintain high aerodynamic performance of the wind turbine blade 10.

In an example illustrated in FIG. 9A, a chord length L from the leading edge 14 formed by the metal strip 21 to the trailing edge 15 is the same as a design chord length $L_0$ which is determined taking account of aerodynamic performance. In this configuration, a chord length $L_1$ of the blade body 13 from an end portion (not including the metal strip 21) on the side of the leading edge 14 to the trailing edge 15 is smaller than the design chord length $L_0$. Accordingly, taking account of mounting of the metal strip 21, the blade body 13 may be formed so that the chord length $L_1$ of the blade body 13 is smaller than the design chord length $L_0$. In this way, it is possible to achieve an airfoil with high aerodynamic performance in a state where the metal strip 21 is mounted.

In an example depicted in FIG. 9B, the chord length $L_1$ of the blade body 13 from an end portion (not including the metal strip 21) on the side of the leading edge 14 to the trailing edge 15 is the same as the design chord length $L_0$. Accordingly, with this configuration, the chord length L from the leading edge 14 to the trailing edge 15 in a state where the metal strip 21 is mounted is greater than the design chord length $L_0$. This configuration can be applied to an existing blade body 13 which is made taking account of aerodynamic performance.

In an embodiment, as depicted in FIGS. 9A to 9C, the wind turbine blade 10 may further include a middle layer 38 which is deformable and disposed between the metal strip 21 and the blade body 13.

With this configuration, it is possible to absorb a thermal-expansion difference between the metal strip 21 and the blade body 13 with the middle layer 38, which is deformable and disposed between the metal strip 21 and the blade body 13. Thus, it is possible to prevent deformation of the metal strip 21 and the blade body 13, and deterioration of a joining condition of the metal strip 21 and the blade body 13, due to a thermal-expansion difference between the metal strip 21 and the blade body 13.

In an embodiment, the metal strip 21 may be an electrocast product.

Providing the metal strip 21 by electroforming increases a form accuracy of the metal strip 21, which makes it possible to maintain high aerodynamic performance of the wind turbine blade 10 and to readily obtain the metal strip 21 with a high erosion-resistant property and less weight.

The metal strip 21 may be obtained by a method other than electroforming.

With reference to FIGS. 1 to 3, a method of producing or retrofitting the wind turbine blade 10 according to some embodiments includes a step of attaching the metal strip 21 for reducing erosion of the leading edge 14 of the blade body 13 of the wind turbine blade 10 to the blade body 13 extending from the blade root 12 along the blade longitudinal direction toward the blade tip 11 so that the metal strip 21 covers at least the leading edge 14 at the side of the blade tip 11.

According to the above method, the metal strip 21 is attached to the blade body 13 of the wind turbine blade 10 so as to cover a part of the blade body 13, which is at least the leading edge 14 at the side of the blade tip 11, which makes it possible to produce or retrofit the wind turbine blade 10 capable of suppressing erosion for a long time.

As described above, according to at least some embodiments of the present invention, the metal strip 21 is disposed so as to cover at least the leading edge 14 at the side of the blade tip 11 of the wind turbine blade 10, which makes it possible to suppress erosion of the wind turbine blade 10 for a long time and to maintain high aerodynamic performance of the wind turbine blade 10.

Embodiments of the present invention were described in detail above, but the present invention is not limited thereto, and various amendments and modifications may be implemented.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The invention claimed is:

1. A wind turbine blade comprising:

a blade body extending from a blade root along a blade longitudinal direction toward a blade tip;

a metal strip provided to cover at least a leading edge at a side of the blade tip of the blade body so as to suppress erosion at the leading edge of the blade body;

a metal receptor which is disposed, in the blade longitudinal direction, adjacent to an end portion of the blade body opposite to the blade root and connected to said end portion of the blade body so as to form the blade tip; and metal foils electrically connected to the metal receptor and provided to extend on a pressure surface and a suction surface of the blade body along the blade longitudinal direction toward the blade root so as to direct lightning current from the metal receptor toward the blade root, wherein the metal strip extends in the blade longitudinal direction from one end of the metal strip that overlaps with the metal receptor to another end of the metal strip, and the metal strip, between the one end and said another end, overlaps with the metal foils to be electrically connected to the metal foils.

2. The wind turbine blade according to claim 1, wherein the metal strip comprises:

a first region overlapping with and fixed to the metal receptor, and a second region positioned nearer to the blade root than the first region is and having a thickness smaller than that of the first region.

3. The wind turbine blade according to claim 2, wherein the thickness within the second region of the metal strip increases toward the first region.

* * * * *